(12) United States Patent
Jensen et al.

(10) Patent No.: US 8,298,423 B1
(45) Date of Patent: *Oct. 30, 2012

(54) PERIPHYTON FILTRATION SYSTEM FOR A ROOF AND ASSOCIATED METHODS

(75) Inventors: Kyle R. Jensen, Apopka, FL (US);
Michael F. Willard, Chicago, IL (US)

(73) Assignee: Aquafiber Technologies Corp., Orlando, FL (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/648,791

(22) Filed: Dec. 29, 2009

Related U.S. Application Data

(63) Continuation-in-part of application No. 11/863,504, filed on Sep. 28, 2007, now Pat. No. 7,638,054.

(51) Int. Cl.
*C02F 3/32* (2006.01)
(52) U.S. Cl. .......................................... 210/602; 210/259
(58) Field of Classification Search ................... 210/602, 210/252, 259, 416.1
See application file for complete search history.

(56) References Cited

U.S. PATENT DOCUMENTS

| | | |
|---|---|---|
| 6,553,723 B1 | 4/2003 | Alcorn |
| 6,797,124 B2 | 9/2004 | Ludwig |
| 7,754,079 B2 * | 7/2010 | Bauer .......................... 210/602 |
| 2005/0120715 A1 | 6/2005 | Labrador |
| 2010/0051540 A1 * | 3/2010 | Wanielista et al. ........... 210/602 |

FOREIGN PATENT DOCUMENTS

| | | |
|---|---|---|
| DE | 4339905 C1 * | 11/1994 |
| DE | 29715819 U1 | 3/1998 |
| GB | 2375761 A | 11/2002 |

* cited by examiner

*Primary Examiner* — Fred Prince
(74) *Attorney, Agent, or Firm* — Carl M. Napolitano; GrayRobinson, P.A.

(57) ABSTRACT

A floway system for a building roof includes a substrate for supporting a periphyton culture that removes nutrient pollution from surface water and isolates the building envelope from solar-induced heat. The substrate is seedable to form a floway. a harvester for harvesting periphyton from the substrate. Water desired to be bioremediated is channeled to an inlet of the periphyton culture. A gutter system includes a sector for collecting cleansed water from an outlet of the periphyton culture having a drain for permitting water to be emptied therefrom and a sector for collecting periphyton harvested from the substrate therein. An element is provided for directing material exiting the periphyton culture outlet selectively between the water-collecting sector and the periphyton-collecting sector.

18 Claims, 11 Drawing Sheets

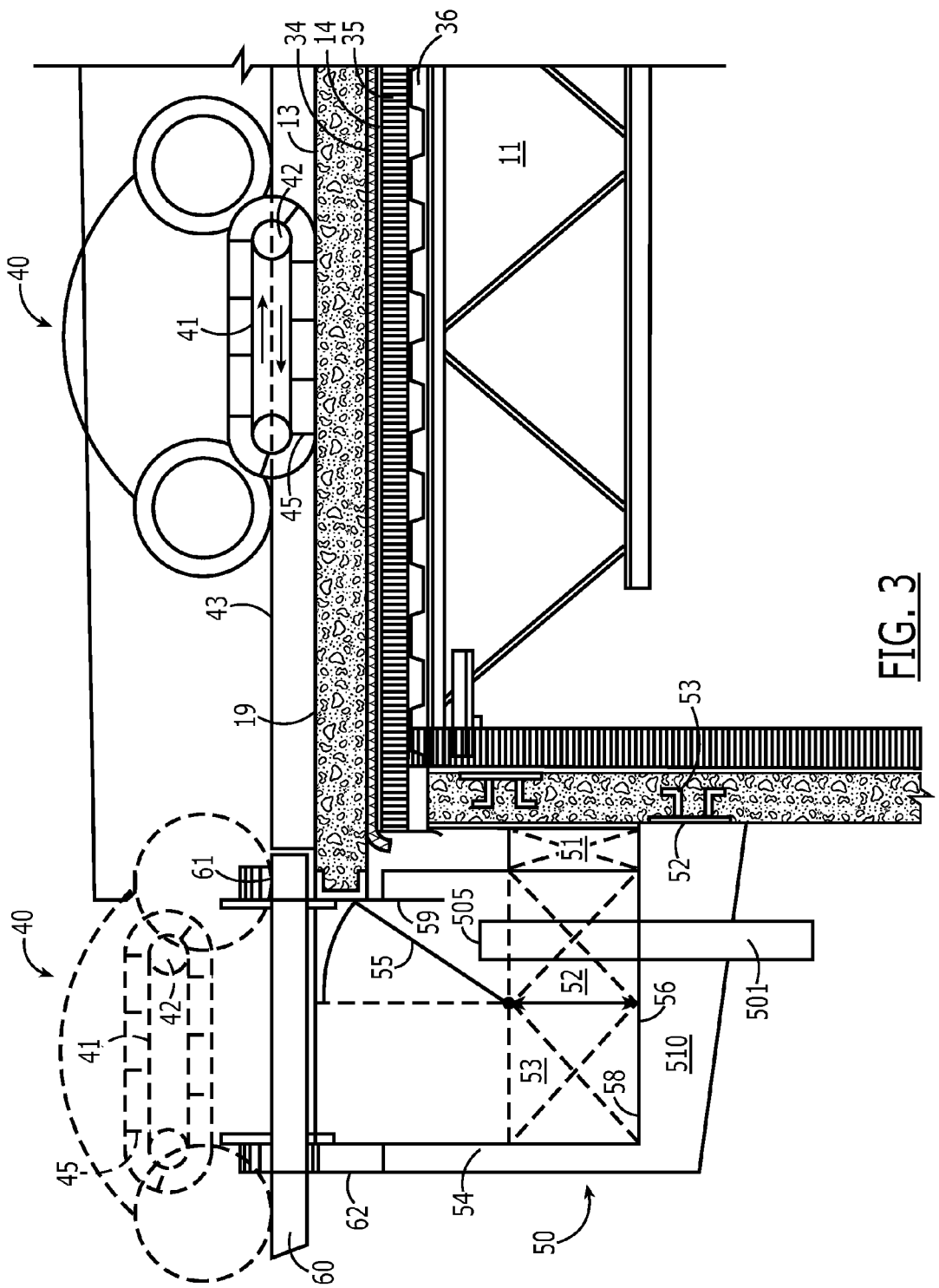

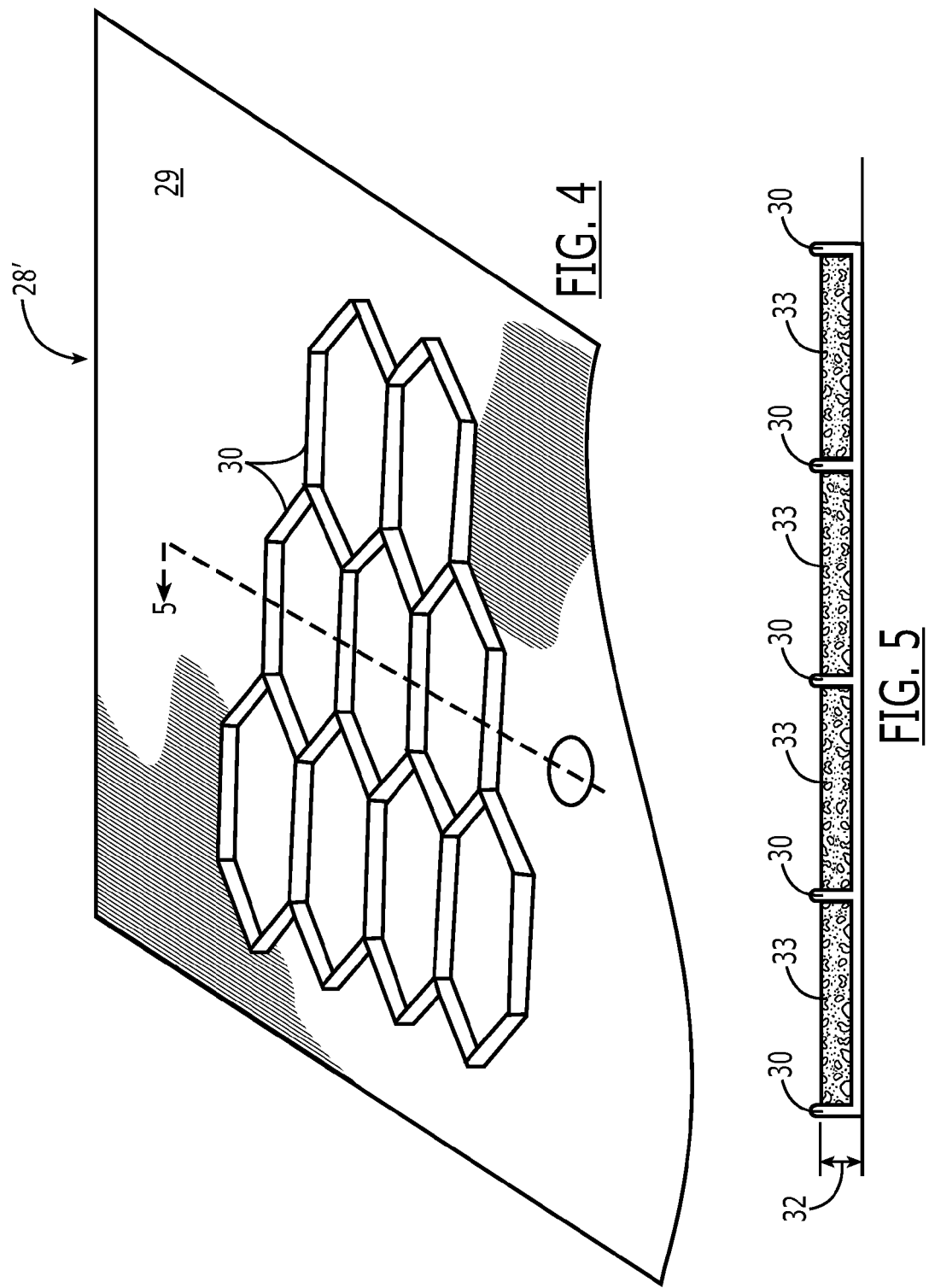

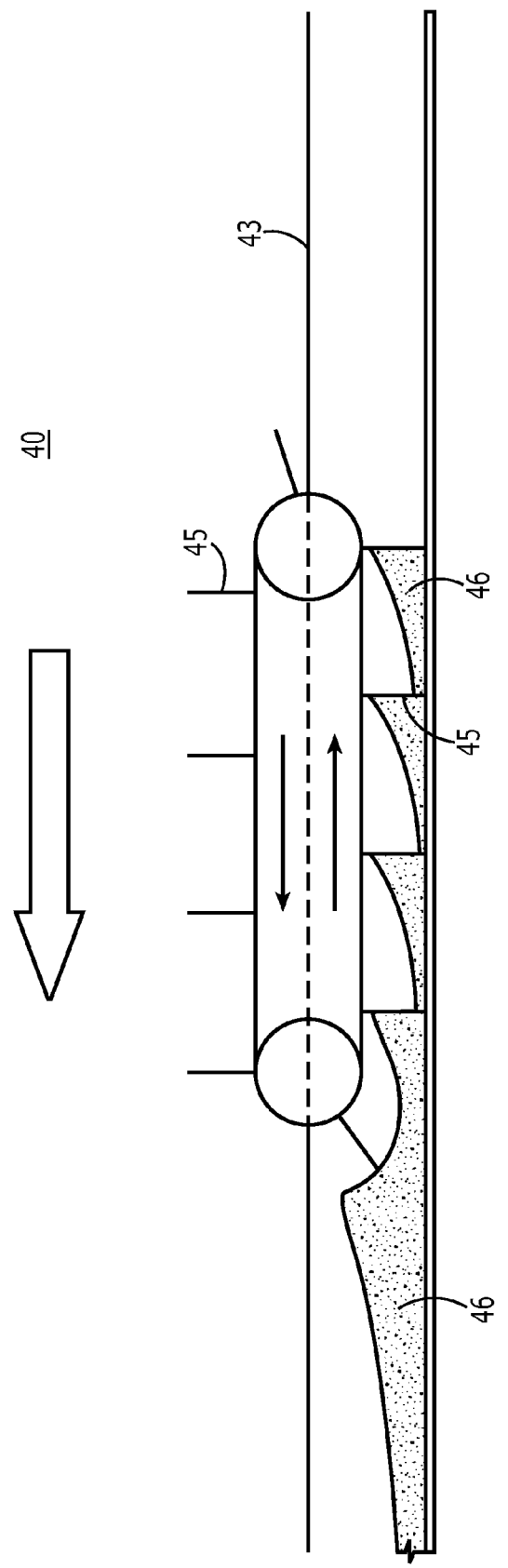

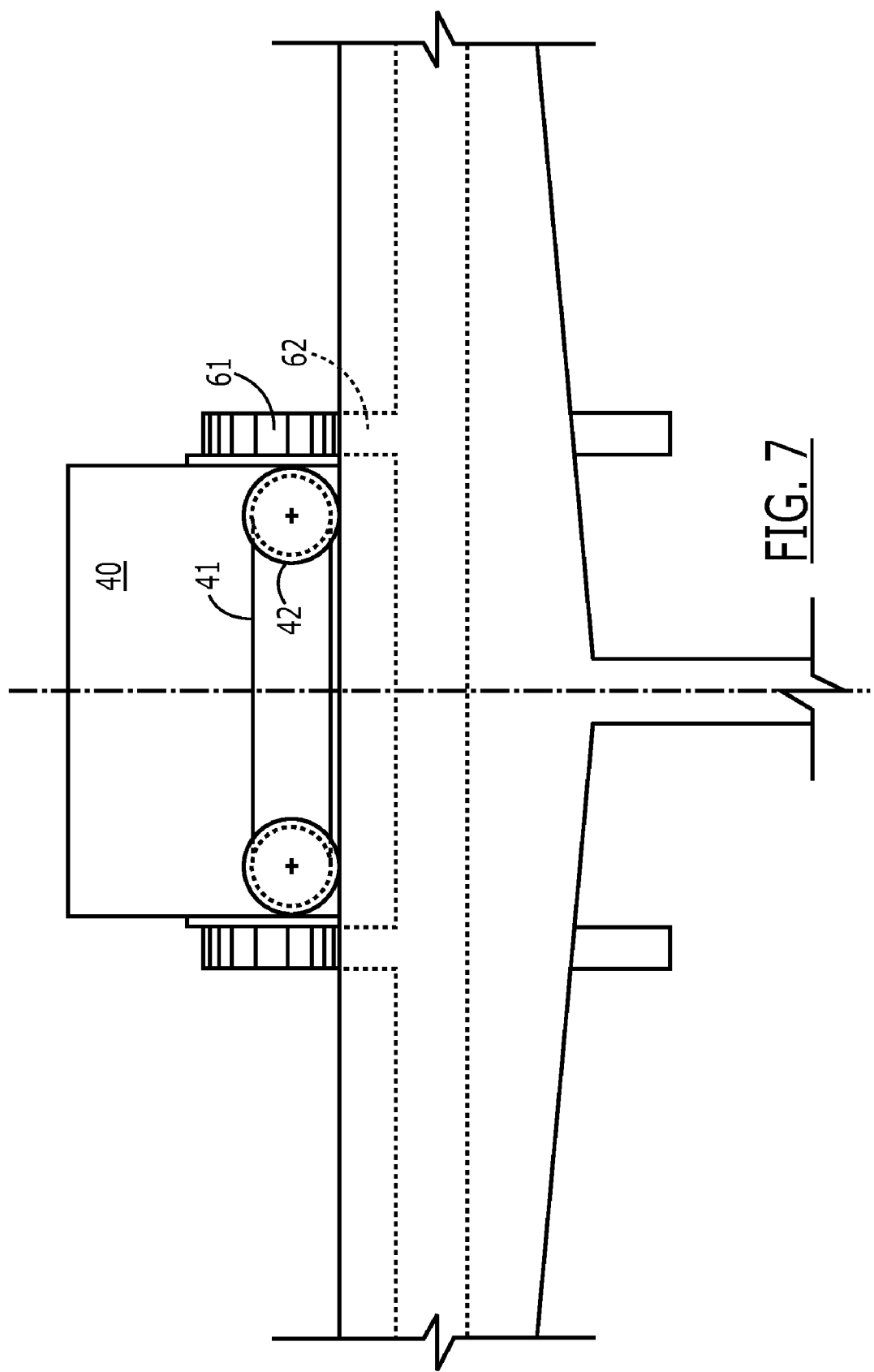

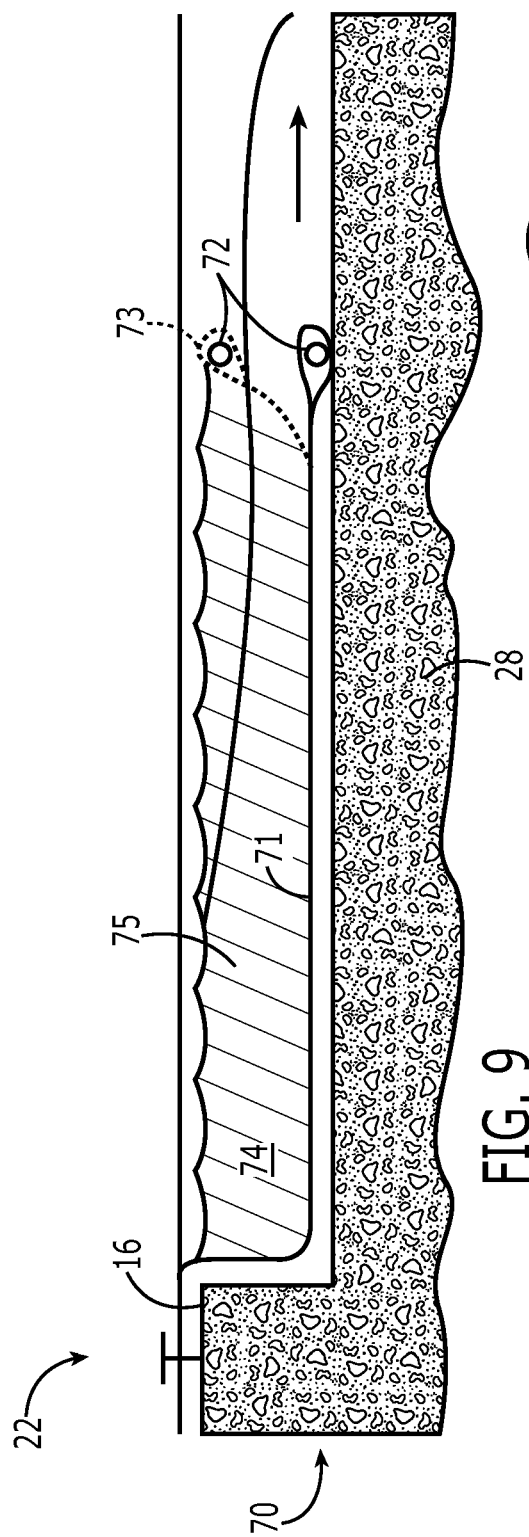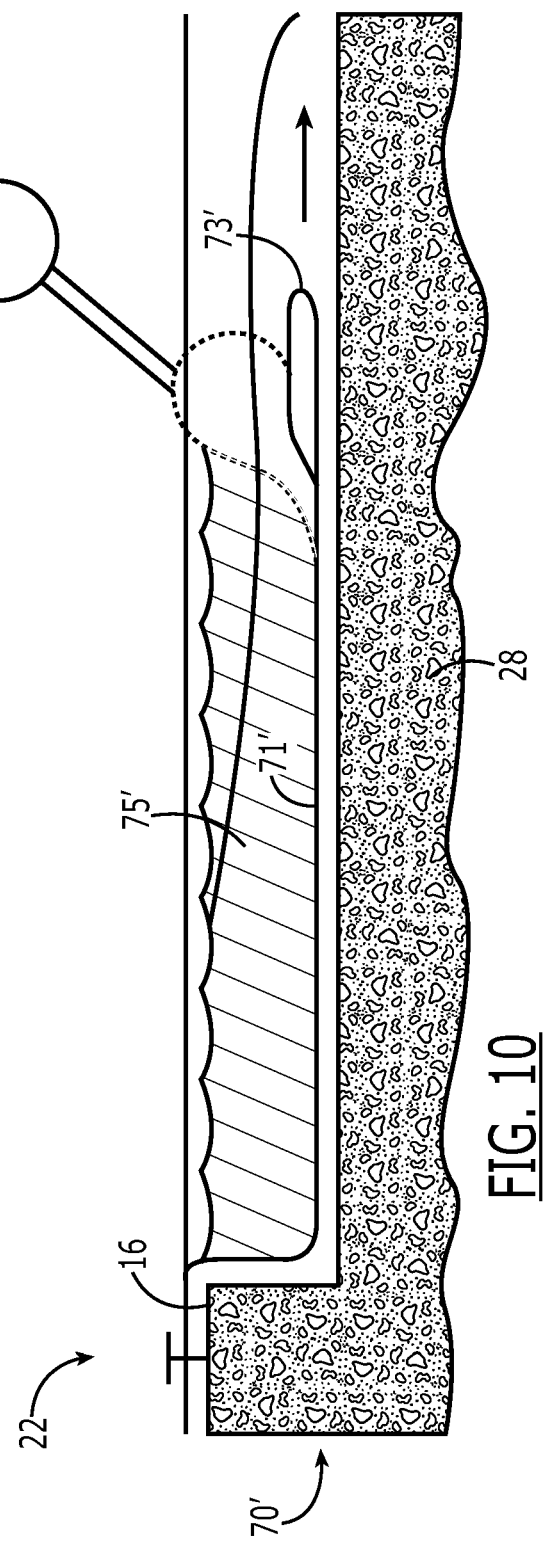

PERIPHYTON FILTRATION SYSTEM FOR A ROOF AND ASSOCIATED METHODS

CROSS-REFERENCE TO RELATED APPLICATIONS

This application is a continuation-in-part of application Ser. No. 11/863,504, filed Sep. 28, 2007, now U.S. Pat. No. 7,638,054, which itself claimed priority to provisional application Ser. No. 60/847,830, filed Sep. 28, 2006.

BACKGROUND OF THE INVENTION

1. Field of the Invention

The present invention relates to systems and methods for water treatment, and, more particularly, to such systems and methods for water treatment via bioremediation, and, most particularly, to such systems and methods for water bioremediation via periphyton filtration.

2. Description of Related Art

The use of periphyton cultures to cleanse water needing treatment is well known in the art, for example, with the use of attached colonies of periphyton on sloped floways wherein water is cleansed of pollutants on its journey from an inlet at a top end of the floway to an outlet at a bottom end of the floway. Over time various refinements have been introduced to these systems in order to improve process design.

Nonetheless, it is believed desirable to provide additional improvements to periphyton filtration systems and methods that can address, for example, site-specific issues, culture contamination, structural integrity, and algal culture harvesting.

SUMMARY OF THE INVENTION

The present embodiments of inventions disclosed herein are directed to periphyton filtration systems and methods applicable to a plurality of sites and conditions. In a particular embodiment, a floway system and method are provided for situating on a building roof.

A system for water bioremediation of the present invention comprises a substrate adapted for supporting a periphyton culture and for being positioned on a roof of a building. The culture system is thermally coupled to the building interior such that the water temperature of the periphyton culture greatly influences the roof top temperature and provides significant cooling advantage to the buildings solar gain in daytime. The substrate is seedable with a periphyton culture to form a floway and has an inlet and an outlet. A basin is provided for holding water to be treated, and a pump in fluid communication with the basin is provided for pumping water therefrom to the floway inlet.

At the floway outlet is positioned a gutter for collecting floway effluent. When in operation, water exiting the floway outlet is channeled to a collection vessel via the gutter. When the floway has matured, algal biomass can be harvested therefrom, for example, with the use of a harvester.

In a particular embodiment, a divider is positioned in the gutter along the long axis of the gutter. A top edge of the divider can be secured adjacent the floway outlet so that, during harvesting, algal biomass is scraped into a distal section of the gutter, from which it can be channeled to a biomass collection basin.

The harvester can include an articulated scraping means and means for traveling down the floway. The harvester and the gutter can also include means for transporting the harvester between adjacent floways. The system can also include means for transporting the harvester to the building roof.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 is a cross-section view of the outlet end of the periphyton roof system with a harvester atop the floway.

FIG. 4 is a top perspective view of a thin concrete culture surface with horizontal expansion grid that can be utilized in any periphyton system, including the system depicted in FIG. 1.

FIG. 5 is a side view of the base as formed using the system of FIG. 4.

FIG. 6 is a side schematic view of one type of harvesting implement.

FIGS. 7 and 8 are side and top plan views of the harvester and carriage system, respectively.

FIGS. 9 and 10 illustrate alternate surge devices for all types of periphyton systems, such as that shown in FIG. 1.

DETAILED DESCRIPTION OF THE PREFERRED EMBODIMENTS

A description of the preferred embodiments of the present invention will now be presented with reference to FIGS. 1-13. As discussed broadly above, the embodiments of the invention are directed to systems and methods of water bioremediation using periphyton filtration techniques.

Figure 1:
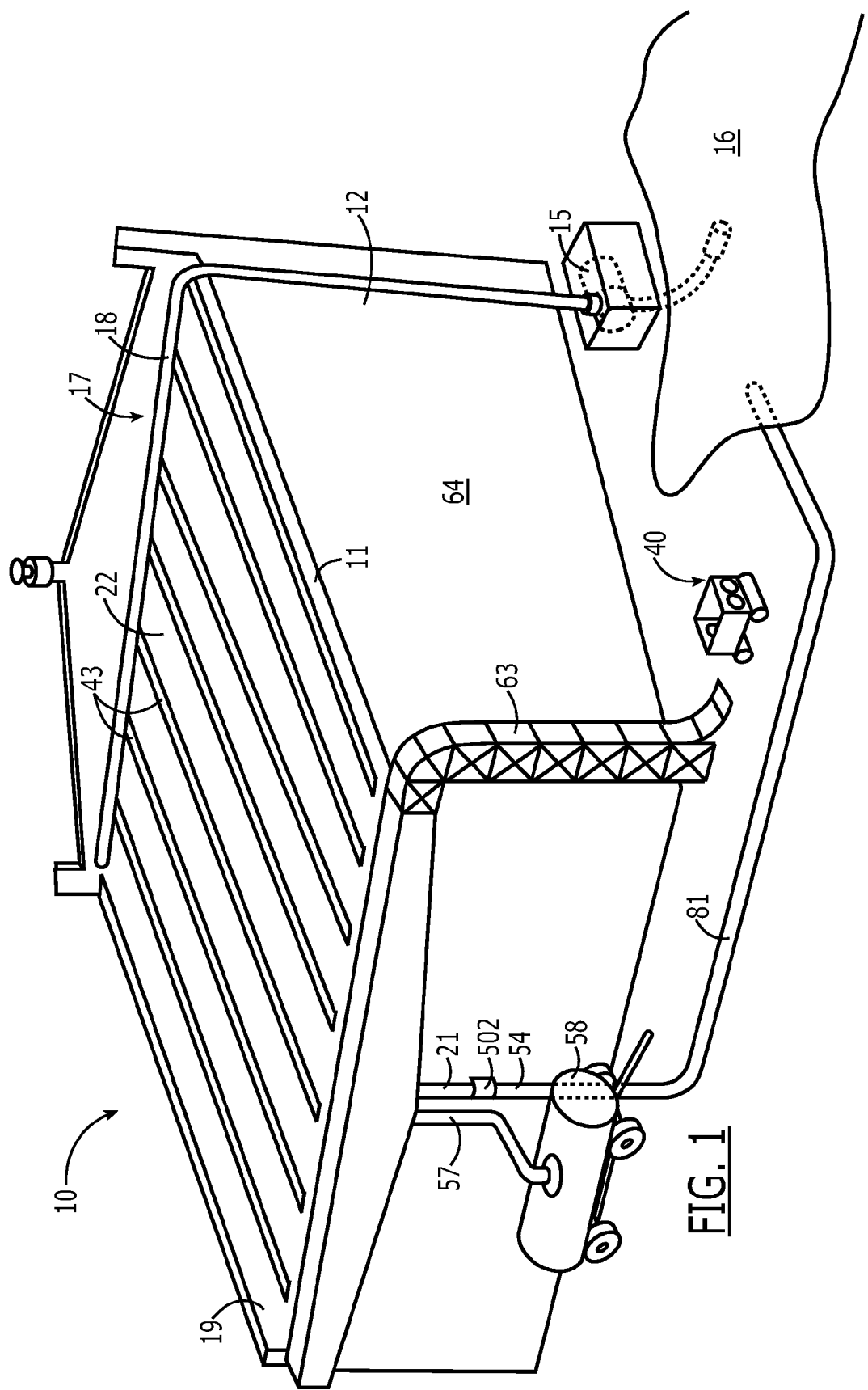
FIG. 1 is a perspective view of a periphyton roof system.
Figure 2:
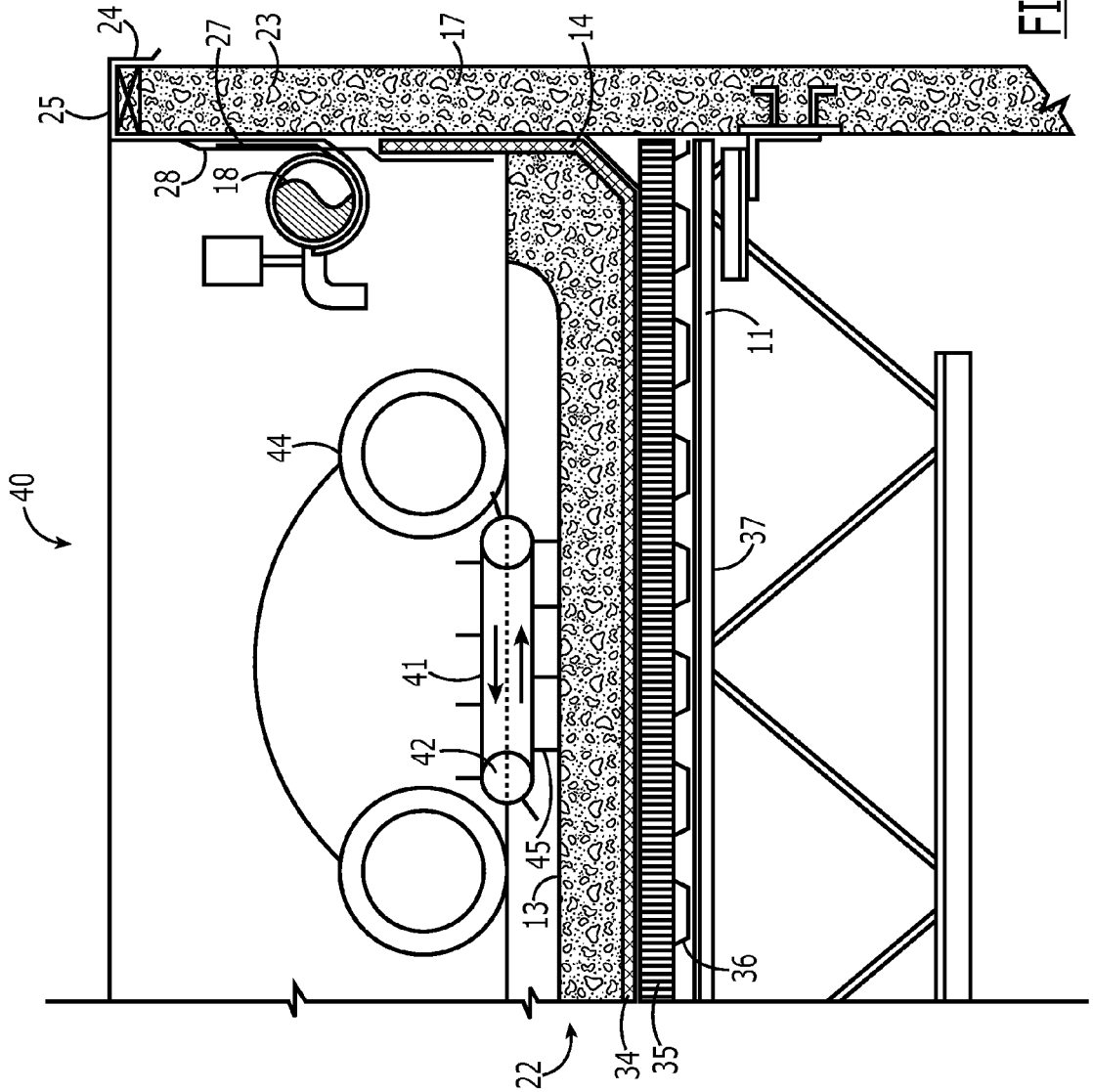
FIG. 2 is a cross-sectional view of the inlet end of the periphyton roof system with a harvester atop the floway.

In an exemplary embodiment is provided a periphyton culture system 10 adapted for implementation on a roof 11 of a building 12 (FIGS. 1-3). It has been known in the art to build so-called "green roofs," which comprise a primary membrane and a secondary containment and drainage system, including gravel and soil as ballast for supporting plants. The plants absorb radiation from sunlight, evapotranspirate water, and perform a cooling function, which can be as high as a 60° F. change (e.g., from 140° F. to 80-90° F. on a roof in Florida in summer). Green roofs can also retain storm water; however, they are known to serve as net contributors of nutrients to surface water.

In the present invention, the periphyton roof system 10 is integrated into the building 12 via its external envelope, mechanical, and aesthetic systems. In some buildings, rooftop mechanical components are incorporated into the culture system. Periphyton cultures 13 are synergistic with roofing systems in having similar slopes and impervious membranes 14 to keep water out of the building 12. While periphyton 13 can be grown directly on the roof 11, in some embodiments the system 10 can combine the architectural, structural, thermal insulation, and moisture-proofing systems so as to capitalize on synergies. The building 12 is thermally coupled to the water on the floway, thereby providing a cooling effect while radiant heat from the sun is substantially intercepted. Additionally, air from a separate system, inside or outside the building 12, can be ventilated through an interstitial space 34 above the primary roof 11 and underneath the periphyton culture system 13. This serves to optimize building cooling during times when the water of the periphyton culture 13 is warmer than ambient air above the periphyton culture system 13.

Preferably, water is pumped 15 onto the roof structure 11 from an inlet basin 16. The inlet basin 16 can in some embodiments include other features such as fish, macrophytes, and aquatic farming systems for food culture. The inlet basin 16 may be at grade or elevated. The inlet basin 16 may comprise, for example, an existing body of high-nutrient water, such as a lake, an estuary, an ocean, a wetland, a wildlife pond, a water feature, a retention pond, or a created basin, although these are not intended to be limiting. Ozonation as discussed in U.S. Pat. Nos. 6,723,243; 6,860,995; 7,022,232; 6,783,676; and 7,014,767 can also be applied as a pre-filtration step.

The water is distributed across the periphyton culture 13 at an inlet end 17 via a distribution element, which can comprise a supply pipe 18, for example, with a substantially even flow rate, although this is not intended as a limitation. The outlet 19 for each individual floway 22 may have a manual or remotely actuated valve for allowing dewatering of the floway 22 prior to harvest. Effluent water from the culture's outlet end 19 is ultimately collected in a cleansed state in a vessel or basin, and can be subjected to further filtration and with gravity head potential while elevated. Such a filter 21 can comprise, for example, a diatom or sand filter, although these are not intended as limitations. In another embodiment, the effluent water can be used to feed a hydroponics arrangement as water falls into the outlet vessel. In another embodiment a water wheel generator can be positioned to take advantage of the energy of the elevated water and generate electricity via generator 502 as it falls off the periphyton culture surface and returns to the basin. In the embodiment shown here, the effluent water is channeled back to the inlet basin 16.

As previously mentioned, in the simplest embodiment, the periphyton is grown directly on an enhanced roofing membrane 14. This membrane 14 can be directly attached to a roof substrate such as lightweight concrete, and is capable of withstanding category 5 hurricane winds. Roofing systems such as the Décor system (Sika Sarnafil, Inc., Canton, Mass.) is one such system that can be used.

In further detail of an exemplary embodiment of the system 10, the floway 22 atop which the periphyton culture 13 is grown is connected to an existing roof structure. In FIG. 2 is illustrated a building's parapet 23 and blocking 24, atop which is positioned cap flashing 25. Additional flashing 26 has a top end interposed between the cap flashing 25 and the parapet 23, extends downward behind and under the supply pipe 18, and runs down into the floway channel.

The membrane 14 has a top end 27 positioned between the additional flashing 26 and the parapet 23, and extends substantially parallel to the parapet 23 and underneath the floway 22.

The floway 22 in this embodiment comprises a precast concrete base 28, curved upward at the inlet end 17 to meet the supply pipe 18, having a depth of 4-12 inches. In another embodiment, the concrete base 28' can be formed (FIGS. 4 and 5) atop a liner 29. A plurality of abutting cells 30, for example, hexagonal cells, are formed from a compressible material with cold joints therebetween. The cells 30 can have a dimension, for example, of 1 foot from the center to a point and a depth 32 of 1.5 inches. An exemplary material can comprise a plastic such as a high-density polyethylene that is ultraviolet-resistant and foamed, thereby possessing the ability to be easily compressed by expanding concrete. A fiber-reinforced mortar/concrete 33 is poured into the cells 30, and the base 28' is formed from the cells 30, which then permit thermal expansion/contraction, a significant advancement over previously used systems wherein at least a 5-inch depth was required with added rebar for tensile strength and calked joints for thermal expansion capability. Clearly, the present system is far less expensive to fabricate, can use less expensive concrete, and weighs far less than prior systems.

A drainage layer 34 is positioned beneath the base 28 that can comprise a horizontal drainage mat, which can expand horizontally and thus take up thermal expansion/contraction of the base 28, thereby preventing undesirable bridging and concurrent vertical displacement and irregular water depth. Beneath the drainage layer 34 is an insulation layer 35, and beneath that decking 36. The decking 36 rests atop the building beam 37. It is important that leakage not be able to enter the building 12, nor condensation, which can encourage mold growth. A vent is positioned at the upstream end of the drainage layer 34 to obviate any vacuum forming and preventing drainage of water.

The periphyton culture 13 is grown on the base 28, which can have an angle to the horizontal of between 0 and 60 degrees, with a flatter slope believed to be more efficient for culture productivity. In a preferred embodiment, a plurality of floways 22 are positioned in substantially parallel configuration to each other, depending upon available space on the roof 11. In one embodiment, wherein the algal culture is positioned directly on the roofing membrane, battens are thermally welded to the membrane, which hydraulically separate the floways, allowing them to be harvested while others remain in service.

In a particular embodiment, the culture 13 can be adapted for drainage after harvesting algal growth, and for desiccation thereafter to control insect populations that can consume the algae. The periphyton can be pre-seeded to guide speciation towards optimal population for the climate.

Harvesting can occur at a climax of the standing crop prior to sloughing or loss of algae, or as mentioned in one of the inventor's previous patents. Sloughing can be utilized as a means of harvesting whereby the sloughed algae are filtered from the outflow. In the simplest embodiment, and with a specific community of algae, the mature periphyton algae can be simply scraped off the culture surface with a squeegee. Urethane elastomer rubber, as manufactured by Harkness Corporation (Cheshire, Conn.), has been used for squeegee material with superior results in abrasion resistance. As an exemplary embodiment, the hardness ratings can be between 40 A and 60 D, although this is not intended as a limitation.

In another particular embodiment, harvesting is accomplished by means of a harvester 40 (FIGS. 6-8) having a conveyor belt 41 driven by spinning drums 42. The harvester 40 can ride on curbs 43 on the floway 22 atop wheels 44, with leading-edge scrapers ("squeegees") 45 that serve to push water and harvested algae 46 ahead of them toward the outlet end 19.

At the outlet end 19 is positioned a gutter system 50 (FIG. 3) that is supported by a gutter support 510, which is attached at the downstream end 52 via a cast-in embedment 153 into the building 12 positioned beneath the floway 22. The gutter support 510 extends substantially horizontally away from the building 12 and terminates in an outer wall 54 that extends upwardly to a height approximately equal to that of the floway 22, forming a valley in which the gutter system 50 resides.

The gutter system 50 comprises three sectors 51-53. The first, innermost sector 51, adjacent the building 12, collects rain and leakage from the floway 22 and the drainage mat 34. This is channeled to the outlet pipe 54 (FIG. 1) for, in this case, return to the basin 16. The second 52 and third 53 sectors are contiguous, and are separable by a hinged flange 55 extending upwardly from the gutter bottom 56. Prior to harvesting, the flange 55 can be positioned substantially vertically from the bottom 56; during harvesting, the flange 55 is bent inwardly to be affixed adjacent the floway 22 to a downwardly depending channeling element 59. Filtered water from the floway 22 enters the second sector 52 and is channeled to the outlet pipe 54. Harvested biomass 46 is channeled over the flange 55 and into the third sector 53, from which it is collected via a biomass pipe 57 into a transport vessel 58. An overflow drain 501 having an upper end 505 is positioned within the second sector 52, for channeling away fluid and preventing flooding of that sector 52 and overflow into the biomass third sector 53.

Figure 8:
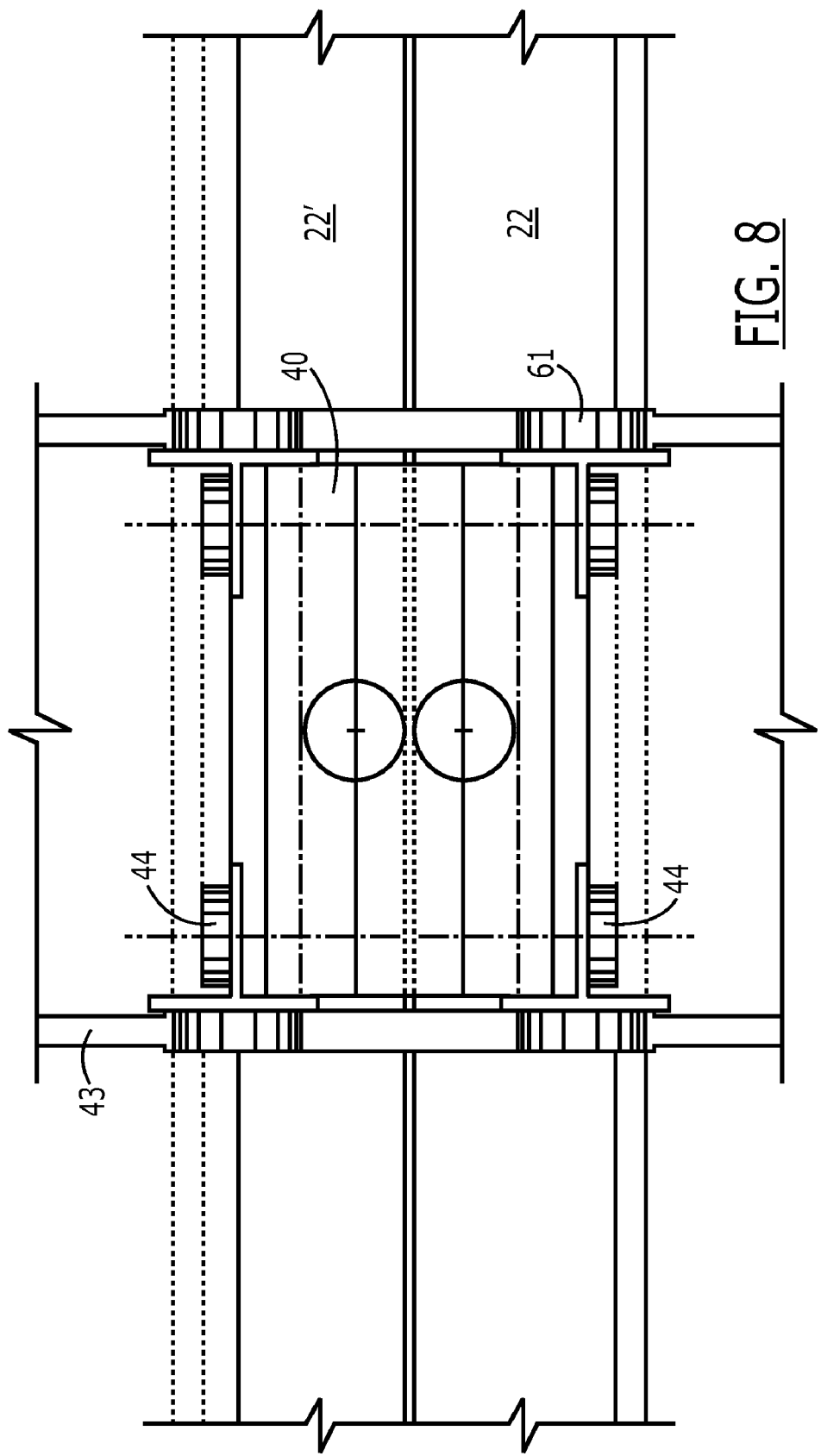
Figure 11:
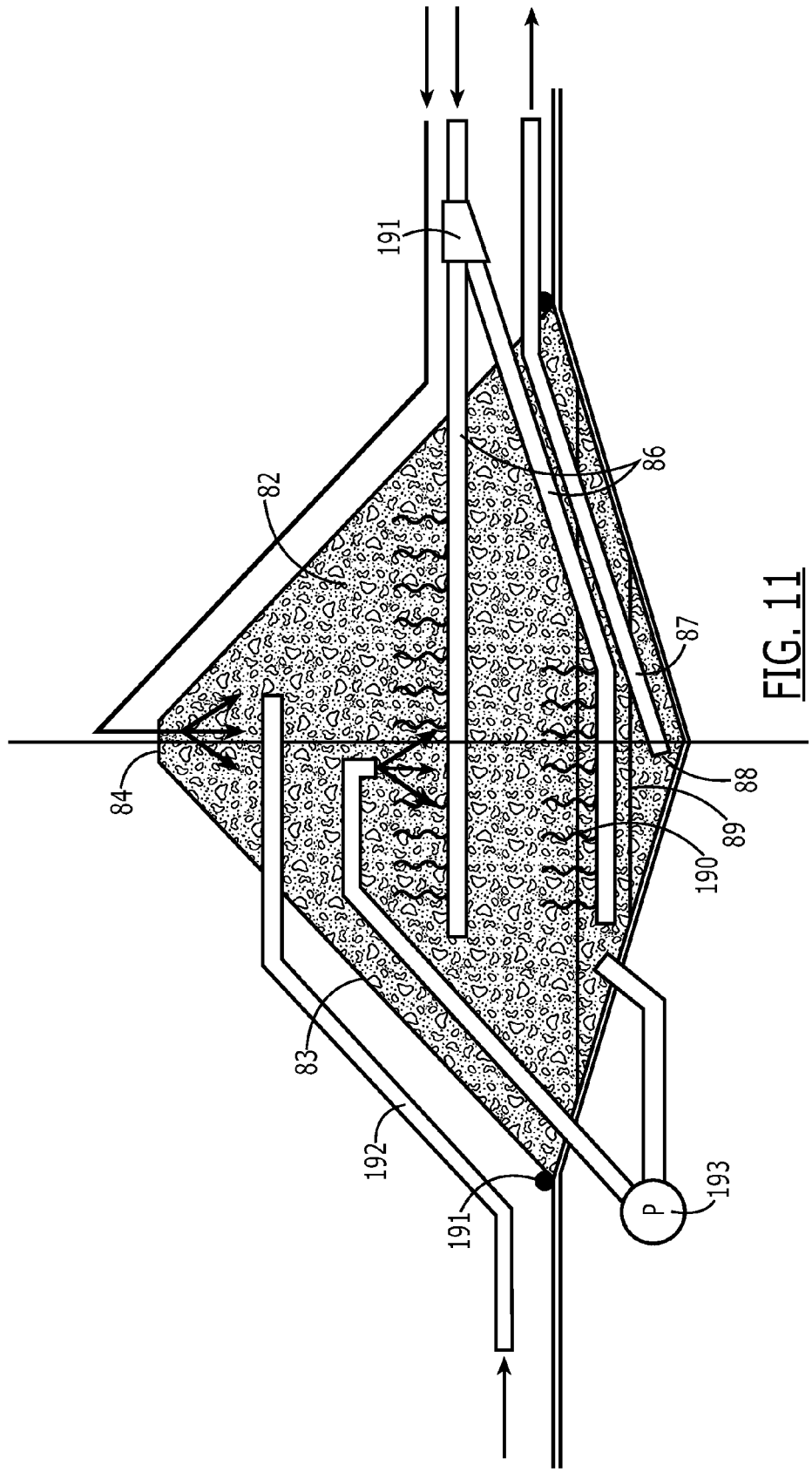
FIG. 11 is a side cross-sectional view of an exemplary calcium reactor.
Figure 12:
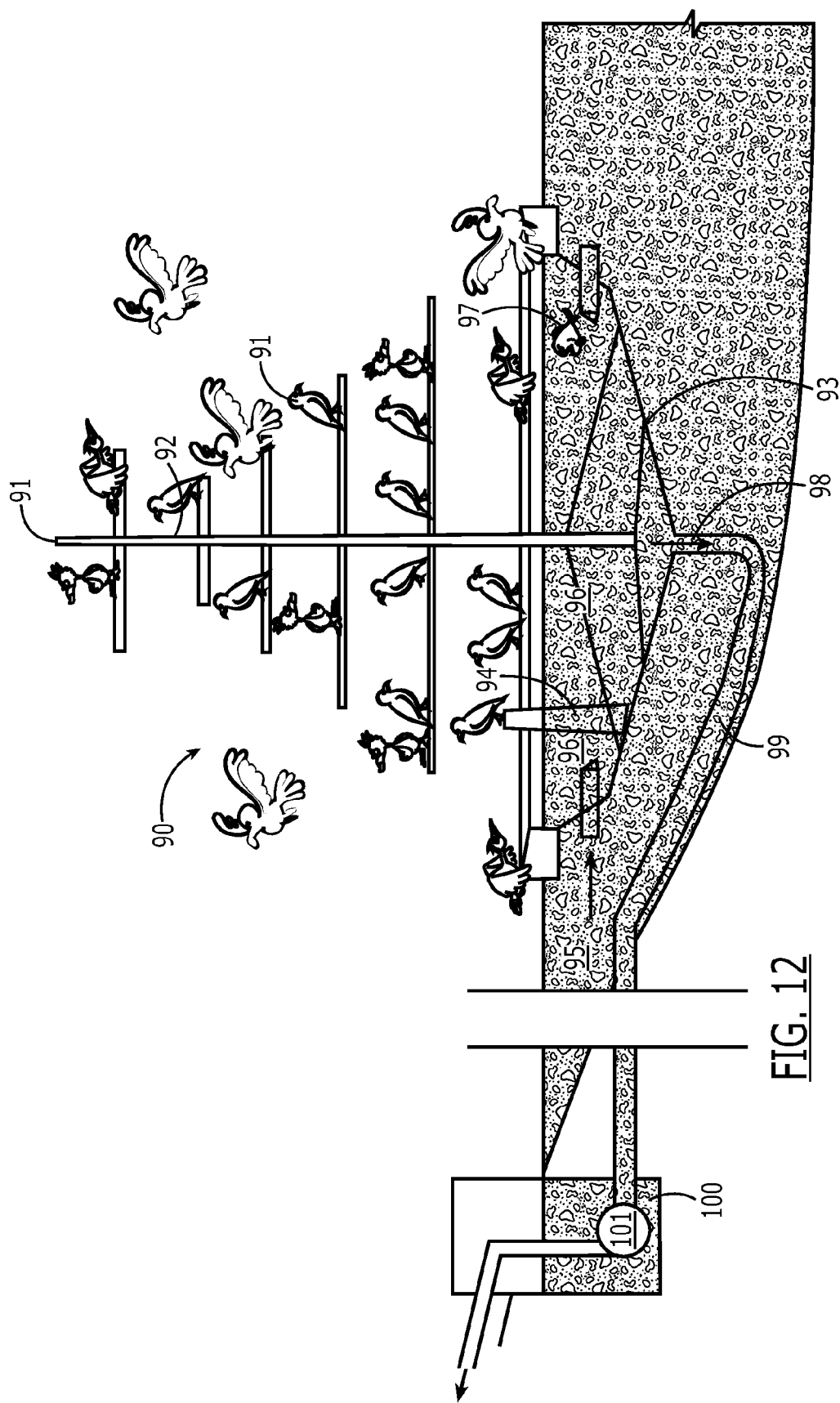
FIG. 12 is a side view of a natural water intake structure capturing nutrients from a bird sanctuary device for use with any periphyton system, such as the roof system disclosed herein.
Figure 13:
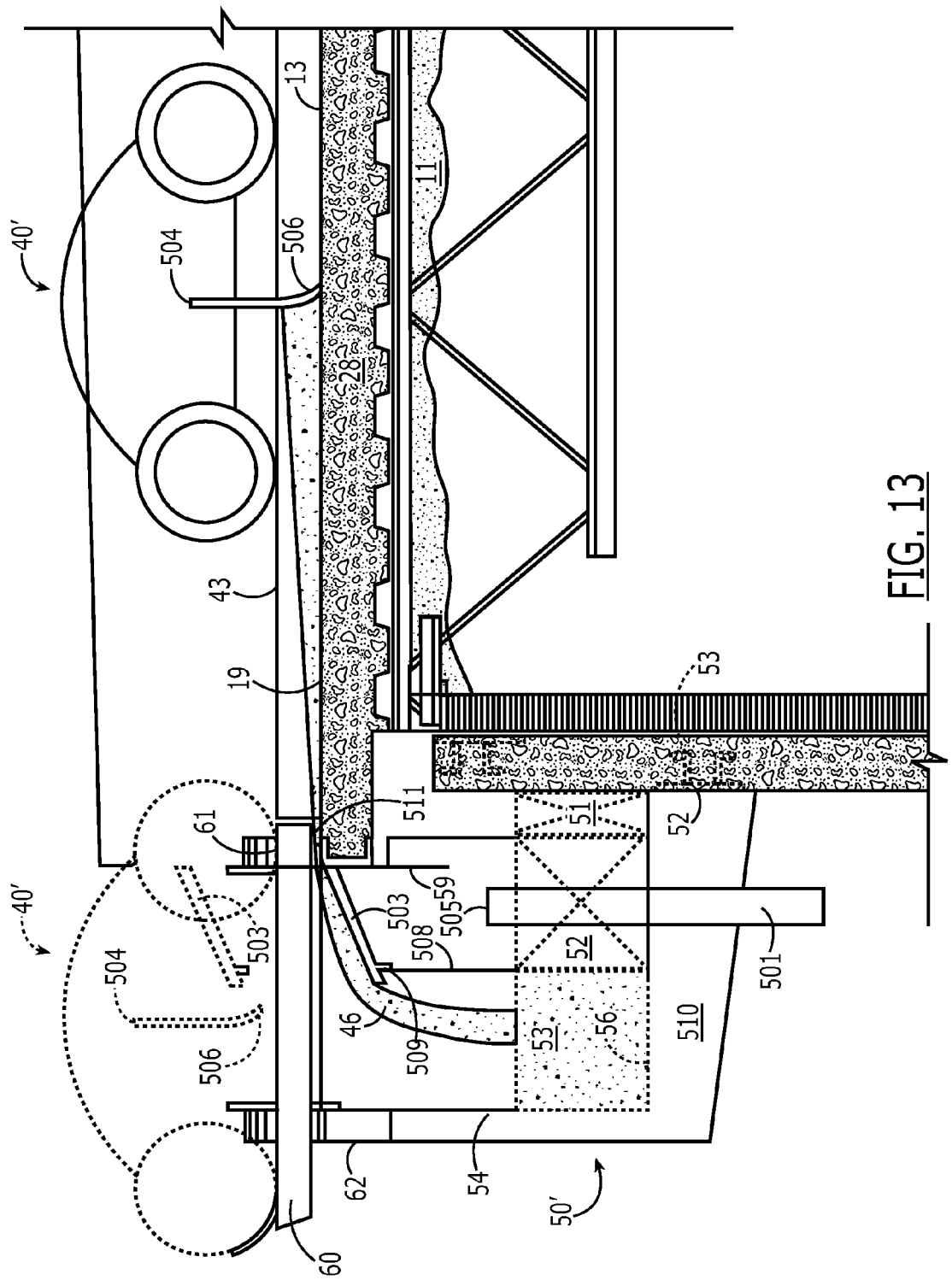
FIG. 13 is another embodiment of a cross-section view of the outlet end of the periphyton roof system with a harvester atop the floway.

Once a particular floway 22 is harvested, the harvester 40 can ride on a carriage 60 having wheels 61 that are positioned on rails 62 that in turn are positioned parallel to the gutters 51-53 and perpendicular to the floway 22, to the next floway 22' to be harvested, and moved to the top of that floway 22' so that harvesting can begin (FIGS. 7 and 8). During the carriage transport, the harvester's belt 41 and drums 42 are elevated to the position illustrated in FIG. 3, so that they do not interfere with the carriage wheels.

The harvester 40 can be delivered to the roof 11 in a number of ways, such as, for example, a railway-type system 63 via robotic control up the side 64 of the building 12 (FIG. 1).

The harvested biomass can be used in a plurality of ways, such as making paper, paper pulp and paper products, textiles, fuels, and feed. Such uses can help offset the cost of operating the system 10.

Another feature of the system 10 includes a surge system for effecting periodic influent surges at the floway inlet 16 (FIGS. 9 and 10) and for serving as intermediate floway weirs. In a particular embodiment (FIG. 9), the surge system 70 can comprise a membrane 71 positionable atop the base 28, the membrane 71 having a cable 72 threaded through a downstream end 73. Water 74 can enter the floway 22 atop the membrane 71, and then the cable 72 can be raised to pull the membrane 71 up, to retain water in the trough 75 formed thereby (dotted line). Then the cable 72 can be lowered so that water in the formed trough 75 is released to flow onto the floway 22.

In an alternate surge system 70' (FIG. 10), instead of a cable 72, a downstream end 73' of the membrane 71' can be inflatable to form the trough 75' and deflated to release water therefrom. The surge cycle can be automated for a predetermined period, such as, in a range of minutes, although this is not intended as a limitation. These methods are believed superior to those currently known in the art, since the trough water is released more gently, thereby causing less damage to the periphyton culture 13.

An additional feature that can be included in the system 10 comprises a calcium reactor 80 (FIG. 11) positioned along the return path 81 to the inlet basin 16. Calcium reactors have been used in aquaria to increase levels of depleted minerals including calcium. Exemplary reactors for small flows are manufactured by Schuran Plastics Processing and Seawater Equipment Company (Jülich, Germany). It is well known by those skilled in the art of calcium reactor design that an association of $CO_2$ and water causes an acidic environment in the presence of calcium carbonate media, which dissolves calcium and other minerals in the media into the water. By this means, $CO_2$ can be "fixed," meaning it is incorporated into algal biomass. The present calcium reactor 80 is inexpensive to construct, and provides additional calcium and other missing nutrients to the system for enhancing algal growth. The calcium reactor 80 can comprise an underlying pile of limestone 82 covered with a water-impervious membrane 83, and having an inlet 84 adjacent the top end 85. The water level in the calcium reactor is adjustable between a first level 190 and a second level adjacent the bottom 89 of the limestone pile 82 by setting diversion valve 191, so that the reaction can occur in the wet but drained zone, or in the flooded zone. One or more inlet channels 86 are provided for admitting carbon dioxide into the interstitial spaces in the limestone pile 82 above and below second 89 and first 190 levels. An outlet channel 87 is provided with an inlet 88 thereinto positioned adjacent the bottom 89 of the limestone pile 82, into which calcium-enhanced water enters for channeling back to the inlet basin 16. Limestone media can be replenished through a conduit 192. A re-circulation pump 193 can take water from adjacent the bottom 89 of the limestone pile 82 and distribute it above the inlet channels 86.

An additional embodiment of a periphyton roof system 10' (FIG. 13), believed at the time of filing to represent the best embodiment, includes the periphyton 13 growing directly on the roof surface 28. A harvester 40' has a unitary, static scraper, or squeegee, 504 that can be deployed from a lowered position (on the right of the figure), in which a bottom 506 of the scraper 504 reaches the growing surface 28, to a raised position (dotted, on the left of the figure) wherein the scraper bottom 506 is in spaced relation from the roof surface 28.

The gutter system 50', in similar fashion to the gutter system 50 discussed above, comprises three sectors 51-53. The second, water-collecting sector 52 is closer to an outlet end 511 of the periphyton floway 22 than the periphyton-collecting sector 53, and these sectors 52,53 are separated by a wall 508. In this embodiment 50' a chute 503 replaces the flange 55 in FIG. 3. The chute 503 is deployable from a biomass-channeling position for channeling harvested biomass 46 into the periphyton-collecting sector 53 to a position in spaced relation from the biomass 46 (shown in dotted outline), wherein cleansed water exiting the floway 22 flows into the water-collecting sector 52.

A drain 501 is positioned within the second sector 52, and has a top end 505 beneath a top edge 509 of the wall 508, for preventing overflow of water into the third sector 53.

Another feature of the system 10 can include a wildlife sanctuary 90 (FIG. 12) for encouraging habitation by aquatic birds 91. A perch system 92 is positioned in the inlet basin 16 above a flotation hull 93 supported by a flotation ring 94 around its periphery. Water 95 from the inlet basin 16 can enter the water 96 contained in the flotation hull 93 via check valves that can admit, for example, fish 97 as well. The contained water 96 will become higher in nutrients than that 95 in the inlet basin 16 owing to bird deposits, and will therefore enhance algal growth.

In this case, water exiting the bottom 98 of the hull 93 is channeled 99 to a well 100 containing a pump 101 for transferring water to the roof 11. Alternatively, a pump could be positioned outside the well 100 adjacent the hull 93, with an inlet in fluid communication with the well 100.

A one-acre roof-top periphyton system 10 as described above can remove nitrogen and phosphorus at a rate between 100 and 1000 times that of manmade wetlands, and can be used in an urban setting with a footprint already being taken up by the building 12 and thus adding no further land requirement. The system 10 can removes 60-100 tons of $CO_2$ per acre per year, as compared with a forested acre, which removes 6 tons of $CO_2$ per acre per year, and reduces urban heat island effect.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details of construction and use.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A roof system for providing environmental benefit comprising:
    a substrate adapted for being positioned on a roof of a building;
    a periphyton culture supported by the substrate having an inlet for receiving water to be bioremediated;
    a harvester for harvesting periphyton from the substrate;
    means for thermally coupling the periphyton culture with an interior of the building; and
    a gutter system comprising:
        a sector for collecting cleansed water from an outlet of the periphyton culture having a drain for permitting water to be emptied therefrom;
        a sector for collecting periphyton harvested from the substrate therein; and
        means for directing material exiting the periphyton culture outlet selectively between the water-collecting sector and the periphyton-collecting sector.

2. The roof system recited in claim 1, wherein the water-collecting sector and the periphyton-collecting sector are adjacent and separated by a wall, and further comprising an overflow drain having an upper end positioned within the water-collecting sector beneath a top edge of the wall, for preventing water in the water-collecting sector from overflowing into the periphyton-collecting sector.

3. The roof system recited in claim 1, further comprising an electric generator positioned to capture kinetic energy of water exiting the drain and generate electrical energy therefrom.

4. The roof system recited in claim 1, wherein the substrate comprises a base for supporting the periphyton culture, and the base and the periphyton culture together comprise a floway, and wherein the floway comprises a plurality of substantially parallel floways hydraulically isolated from each other, to permit selective draining of at least one floway.

5. The roof system recited in claim 4, further comprising means for harvesting the periphyton culture into the periphyton-collecting sector.

6. The roof system recited in claim 5, wherein the harvesting means comprises an elastomeric rubber squeegee.

7. The roof system recited in claim 5, wherein floways comprise longitudinally extending curbs therebetween, and the harvesting means comprises a harvester having spaced-apart wheels dimensioned for riding along adjacent curbs for harvesting the periphyton culture therebetween.

8. The roof system recited in claim 7, wherein the harvester comprises a conveyor belt and a drum in driving relation to the conveyor belt in a direction parallel to the floway, a bottom portion of the conveyor belt movable toward the floway outlet, the conveyor belt comprising a squeegee extending outwardly therefrom, for scraping periphyton culture material toward the periphyton-collecting sector as the harvester proceeds toward the floway outlet.

9. The roof system recited in claim 7, further comprising a carriage adapted for transporting the harvester between floways, the carriage positioned adjacent the periphyton culture outlets and substantially perpendicular to the floways.

10. The roof system recited in claim 1, wherein the material-directing means comprises a chute deployable between a biomass-channeling position for receiving harvested periphyton exiting the periphyton culture outlet and channeling the harvested periphyton to the periphyton-collecting sector and an inactive position in spaced relation from the periphyton culture outlet.

11. The roof system recited in claim 1, further comprising means adjacent the periphyton culture inlet for periodically surging water entering the periphyton culture.

12. A method for establishing a roof system for providing environmental benefit comprising the steps of:
    supporting a periphyton culture atop a roof of a building;
    thermally coupling the periphyton culture with an interior of the building;
    channeling water desired to be bioremediated to an inlet of the periphyton culture;
    collecting water exiting an outlet of the periphyton culture in a water-collecting sector of a gutter system;
    harvesting periphyton from the periphyton culture; and
    collecting harvested periphyton in a periphyton-collecting sector of the gutter system, and water-collecting and the periphyton-collecting sectors separate from each other.

13. The method recited in claim 12, wherein the substrate comprises a base for supporting the periphyton culture, and the base and the periphyton culture together comprise a floway, and wherein the floway comprises a plurality of substantially parallel floways hydraulically isolated from each other, to permit selective draining of at least one floway.

14. The method recited in claim 13, wherein the harvesting comprises using an elastomeric rubber squeegee to scrape periphyton from the substrate into the periphyton-collecting sector.

15. The method recited in claim 14, wherein floways comprise longitudinally extending curbs therebetween, and the harvesting step comprises propelling a harvester along adjacent curbs for harvesting the periphyton culture therebetween.

16. The method recited in claim 15, wherein the harvester comprises a conveyor belt and a drum in driving relation to the conveyor belt in a direction parallel to the floway, a bottom portion of the conveyor belt movable toward the floway outlet, the conveyor belt comprising a squeegee extending outwardly therefrom, and the harvesting step comprises scraping periphyton culture material toward the periphyton-collecting sector as the harvester proceeds toward the floway outlet.

17. The method recited in claim 16, further comprising the step of transporting the harvester between floways using a carriage, the carriage positioned adjacent the periphyton culture outlets and substantially perpendicular to the floways.

18. The method recited in claim 12, further comprising the step of periodically surging water entering the periphyton culture.

* * * * *